US007388949B2

(12) United States Patent
Contractor et al.

(10) Patent No.: US 7,388,949 B2
(45) Date of Patent: Jun. 17, 2008

(54) SYSTEM AND METHOD FOR AUDIO CALLER IDENTIFICATION SERVICE

(75) Inventors: Sunil H. Contractor, Marietta, GA (US); James C. Bedingfield, Sr., Lilburn, GA (US); Scott Holt, Decatur, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 64 days.

(21) Appl. No.: 09/749,869

(22) Filed: Dec. 28, 2000

(65) Prior Publication Data
US 2002/0085687 A1 Jul. 4, 2002

(51) Int. Cl.
*H04M 15/06* (2006.01)
(52) U.S. Cl. ............................. 379/142.06; 379/201.11; 379/211.02; 379/220.01; 455/417
(58) Field of Classification Search ................................
379/221.08–221.12, 221.09, 221.1, 76, 374.02,
379/207.09, 207.1, 201.01, 88.21, 211.01–211.02,
379/142.01–142.11, 142.13–142.15, 220.01,
379/201.04, 67.1, 212.01, 213.01, 201.11;
370/259; 709/202; 455/417
See application file for complete search history.

(56) References Cited

U.S. PATENT DOCUMENTS

| 4,266,098 | A | 5/1981 | Novak ........................ 179/5.5 |
| 4,268,722 | A | 5/1981 | Little et al. .................. 179/2 |
| 4,277,649 | A | 7/1981 | Sheinbein ................... 179/18 |
| 4,582,956 | A | 4/1986 | Doughty ...................... 179/2 |
| 4,649,433 | A | 3/1987 | Verhoeven |
| 4,649,533 | A | 3/1987 | Chorley et al. ............... 370/58 |
| 4,663,777 | A | 5/1987 | Szeto |

(Continued)

FOREIGN PATENT DOCUMENTS

EP        0 821 511 A2      1/1998

(Continued)

OTHER PUBLICATIONS

U.S. Appl. No. 09/468,888, filed Dec. 22, 1999, Bedingfield.

(Continued)

*Primary Examiner*—Fan Tsang
*Assistant Examiner*—M. S. Alam Elahee
(74) *Attorney, Agent, or Firm*—Cantor Colburn LLP

(57) ABSTRACT

Methods and systems are disclosed for audibly announcing information associated with a calling party in an advanced intelligent network comprising a service switching point, a service control point and a services node. The service switching point is adapted to suspend calls directed to an audio caller identification service and to forward information concerning the calling and called parties to the service control point. The service control point is adapted to direct the call to a selected services node. The services node sends a query to retrieve information concerning the calling party from the service control point. If necessary, other service control points may be queried for the information. While the aforementioned processing is occurring, the calling party continues to hear a ringing signal. When the aforementioned information is retrieved, the service directs a second call to the called party. When an operator from the called party station answers the phone, the service audibly announces information concerning the calling party and the called party is provided an opportunity to accept or reject the call.

37 Claims, 2 Drawing Sheets

U.S. PATENT DOCUMENTS

| | | | |
|---|---|---|---|
| 4,698,839 A | 10/1987 | De Vaney et al. | 379/60 |
| 4,791,664 A | 12/1988 | Lutz et al. | 379/199 |
| 4,797,911 A | 1/1989 | Szlam et al. | 379/67 |
| 4,802,202 A | 1/1989 | Takahashi et al. | 379/67 |
| 4,817,133 A | 3/1989 | Takahashi et al. | 379/199 |
| 4,823,304 A | 4/1989 | Frantz et al. | 364/900 |
| 4,845,743 A | 7/1989 | Lutz | 379/199 |
| 4,850,013 A | 7/1989 | Rose | |
| 4,850,103 A | 7/1989 | Takemoto et al. | 29/827 |
| 4,995,075 A | 2/1991 | Angiolillo-Bent et al. | 379/142 |
| 5,029,196 A | 7/1991 | Morganstein | 379/67 |
| 5,109,405 A | 4/1992 | Morganstein | 379/89 |
| 5,121,423 A | 6/1992 | Morihiro et al. | |
| 5,151,929 A | 9/1992 | Wolf | 379/57 |
| 5,157,712 A | 10/1992 | Wallen, Jr. | 379/74 |
| 5,161,181 A | 11/1992 | Zwick | 379/67 |
| 5,200,994 A | 4/1993 | Sasano et al. | 379/142 |
| 5,206,901 A | 4/1993 | Harlow et al. | 379/211 |
| D338,889 S | 8/1993 | Fuqua et al. | |
| 5,260,987 A | 11/1993 | Mauger | 379/58 |
| 5,263,084 A | 11/1993 | Chaput et al. | |
| 5,265,145 A | 11/1993 | Lim | 379/88 |
| 5,274,699 A | 12/1993 | Ranz | |
| 5,278,894 A | 1/1994 | Shaw | 379/67 |
| 5,289,542 A | 2/1994 | Kessler | 380/9 |
| 5,315,650 A | 5/1994 | Smith et al. | 379/399 |
| 5,329,578 A | 7/1994 | Brennan et al. | |
| 5,333,152 A | 7/1994 | Wilber | |
| 5,338,889 A | 8/1994 | Vora et al. | 568/697 |
| 5,341,411 A | 8/1994 | Hashimoto | 379/67 |
| 5,347,574 A | 9/1994 | Morganstein | 379/210 |
| 5,361,295 A | 11/1994 | Solomon et al. | 379/67 |
| 5,383,466 A | 1/1995 | Partika | 128/662.03 |
| 5,386,460 A | 1/1995 | Boakes et al. | 379/96 |
| 5,388,150 A | 2/1995 | Schneyer et al. | 379/67 |
| 5,413,605 A | 5/1995 | Ashby et al. | 623/20 |
| 5,420,910 A | 5/1995 | Rudokas et al. | |
| 5,420,914 A | 5/1995 | Blumhardt | 379/114 |
| 5,420,920 A | 5/1995 | Capper et al. | |
| 5,425,076 A | 6/1995 | Knippelmier | 379/27 |
| 5,425,089 A | 6/1995 | Chan et al. | 379/183 |
| 5,430,719 A | 7/1995 | Weisser, Jr. | 370/58.2 |
| 5,446,785 A | 8/1995 | Hirai | 379/142 |
| 5,452,089 A | 9/1995 | Bushman | |
| 5,452,346 A | 9/1995 | Miyamoto | 379/142 |
| 5,459,779 A | 10/1995 | Backaus et al. | 379/201 |
| 5,466,785 A | 11/1995 | De Framond | |
| 5,467,388 A | 11/1995 | Redd, Jr. et al. | 379/196 |
| 5,475,748 A | 12/1995 | Jones | 379/211 |
| 5,481,594 A | 1/1996 | Shen et al. | 379/67 |
| 5,481,599 A | 1/1996 | MacAllister et al. | |
| 5,481,602 A * | 1/1996 | Griffiths et al. | 379/211.01 |
| 5,490,205 A | 2/1996 | Kondo et al. | 379/67 |
| 5,497,414 A | 3/1996 | Bartholomew | 379/142 |
| 5,502,762 A | 3/1996 | Andrew et al. | 379/202 |
| 5,506,893 A | 4/1996 | Buscher et al. | |
| 5,511,111 A | 4/1996 | Serbetcioglu et al. | 376/67 |
| 5,530,741 A | 6/1996 | Rubin | 379/142 |
| 5,533,106 A | 7/1996 | Blumhardt | 379/142 |
| 5,535,265 A | 7/1996 | Suwandhaputra | 379/97 |
| 5,539,809 A | 7/1996 | Mayer | |
| 5,546,447 A | 8/1996 | Skarbo et al. | 379/142 |
| 5,550,900 A | 8/1996 | Ensor et al. | 379/67 |
| 5,550,905 A | 8/1996 | Silverman | 379/142 |
| 5,563,935 A | 10/1996 | Small | 379/199 |
| 5,563,936 A | 10/1996 | Washington | |
| 5,602,908 A | 2/1997 | Fan | 379/199 |
| 5,608,788 A | 3/1997 | Demlow et al. | 379/142 |
| 5,619,561 A | 4/1997 | Reese | 379/142 |
| 5,631,950 A | 5/1997 | Brown | 379/67 |
| 5,636,269 A | 6/1997 | Eisdorfer | |
| 5,644,629 A | 7/1997 | Chow | 379/142 |
| 5,646,979 A | 7/1997 | Knuth | 455/563 |
| 5,657,372 A | 8/1997 | Ahlberg et al. | 455/414 |
| D383,466 S | 9/1997 | Burrell et al. | D14/240 |
| 5,668,852 A | 9/1997 | Holmes | 405/31.2 |
| 5,696,809 A | 12/1997 | Voit | 379/5 |
| 5,696,815 A | 12/1997 | Smyk | 379/142 |
| 5,699,413 A | 12/1997 | Sridhar | |
| 5,699,523 A | 12/1997 | Li et al. | 395/200.15 |
| 5,701,301 A | 12/1997 | Weisser, Jr. | 370/428 |
| 5,703,934 A | 12/1997 | Zicker et al. | 379/61 |
| H1714 H | 3/1998 | Partridge, III | |
| 5,724,412 A | 3/1998 | Srinivasan | 379/93.23 |
| 5,734,706 A | 3/1998 | Windsor et al. | 379/142 |
| 5,742,668 A | 4/1998 | Pepe et al. | |
| 5,754,635 A | 5/1998 | Kim | 379/142 |
| 5,754,636 A | 5/1998 | Bayless et al. | |
| 5,754,775 A | 5/1998 | Adamson et al. | |
| 5,771,281 A | 6/1998 | Batten, Jr. | 379/93.23 |
| 5,771,283 A | 6/1998 | Chang et al. | 379/142 |
| 5,781,621 A | 7/1998 | Lim et al. | 379/142 |
| 5,784,444 A | 7/1998 | Snyder et al. | 379/142 |
| 5,796,806 A | 8/1998 | Birckbichler | 379/67 |
| 5,799,072 A | 8/1998 | Vulcan et al. | 379/114 |
| 5,802,160 A | 9/1998 | Kugell et al. | 379/211 |
| 5,802,251 A | 9/1998 | Cohen et al. | 395/2.84 |
| 5,805,587 A | 9/1998 | Norris et al. | 370/352 |
| 5,805,682 A | 9/1998 | Voit et al. | 379/142 |
| 5,805,997 A | 9/1998 | Farris | 455/461 |
| 5,809,128 A | 9/1998 | McMullin | 379/215 |
| 5,812,533 A * | 9/1998 | Cox et al. | 370/259 |
| 5,812,649 A | 9/1998 | Shen | 379/142 |
| 5,838,774 A | 11/1998 | Weisser, Jr. | 379/92.02 |
| 5,841,838 A | 11/1998 | Itoh et al. | 379/67 |
| 5,841,850 A | 11/1998 | Fan | 379/142 |
| 5,848,142 A | 12/1998 | Yaker | |
| 5,850,435 A * | 12/1998 | Devillier | 379/374.02 |
| 5,850,436 A | 12/1998 | Rosen et al. | |
| 5,857,017 A | 1/1999 | Ohi | |
| 5,859,903 A | 1/1999 | Lee | 379/157 |
| 5,872,834 A | 2/1999 | Teitelbaum | |
| 5,872,934 A | 2/1999 | Whitehouse et al. | |
| 5,878,036 A | 3/1999 | Spartz et al. | 370/335 |
| 5,883,942 A | 3/1999 | Lim et al. | |
| 5,884,144 A | 3/1999 | Chavez, Jr. et al. | 455/31.3 |
| 5,894,504 A | 4/1999 | Alfred et al. | 379/88.13 |
| 5,901,209 A | 5/1999 | Tannenbaum et al. | |
| 5,901,212 A | 5/1999 | True et al. | 379/215 |
| 5,903,636 A | 5/1999 | Malik | 379/142 |
| 5,905,794 A | 5/1999 | Gunn et al. | 379/382 |
| 5,907,596 A | 5/1999 | Karnowski | 379/88.21 |
| 5,907,604 A | 5/1999 | Hsu | 379/142 |
| 5,915,000 A | 6/1999 | Nguyen et al. | 379/52 |
| 5,917,817 A | 6/1999 | Dunn et al. | 370/352 |
| 5,923,744 A | 7/1999 | Cheng | 379/207 |
| 5,930,701 A | 7/1999 | Skog | 455/415 |
| 5,940,484 A | 8/1999 | DeFazio et al. | 379/142 |
| 5,943,416 A | 8/1999 | Gisby | |
| 5,946,363 A | 8/1999 | Rominger et al. | 375/376 |
| 5,946,636 A | 8/1999 | Uyeno et al. | |
| 5,946,684 A | 8/1999 | Lund | 707/10 |
| D413,605 S | 9/1999 | Thomas | D14/240 |
| 5,948,040 A | 9/1999 | DeLorme et al. | 701/201 |
| 5,948,061 A | 9/1999 | Merriman et al. | |
| 5,949,865 A | 9/1999 | Fusinato | 379/207 |
| 5,953,399 A | 9/1999 | Farris et al. | 379/201 |
| 5,953,657 A * | 9/1999 | Ghisler | 455/417 |
| 5,963,626 A | 10/1999 | Nabkel | 379/142 |
| 5,969,647 A | 10/1999 | Mou et al. | 341/55 |
| 5,970,127 A | 10/1999 | Smith et al. | 379/142 |
| 5,970,128 A | 10/1999 | Kim | 379/142 |
| 5,974,309 A | 10/1999 | Foti | 455/412 |
| 5,982,866 A | 11/1999 | Kowalski | 379/127 |

| | | | |
|---|---|---|---|
| 5,991,377 A | 11/1999 | Malik ........................ 379/114 |
| 5,999,207 A | 12/1999 | Rodriguez et al. ............ 348/14 |
| 5,999,599 A | 12/1999 | Shaffer et al. |
| 5,999,613 A | 12/1999 | Nabkel et al. ............... 379/215 |
| 6,006,087 A | 12/1999 | Amin ........................ 455/413 |
| 6,009,321 A | 12/1999 | Wang et al. ................. 455/410 |
| 6,014,559 A | 1/2000 | Amin ........................ 455/413 |
| 6,016,512 A | 1/2000 | Huitema |
| 6,021,188 A | 2/2000 | Meg .......................... 379/142 |
| 6,021,427 A | 2/2000 | Spagna et al. ............... 709/206 |
| 6,031,899 A | 2/2000 | Wu ........................... 379/142 |
| 6,044,148 A | 3/2000 | Bleile ........................ 379/375 |
| 6,049,291 A | 4/2000 | Kikinis .................. 340/825.44 |
| 6,058,171 A | 5/2000 | Hoopes |
| 6,061,434 A | 5/2000 | Corbett .................... 379/93.35 |
| 6,061,566 A | 5/2000 | Friman ..................... 455/445 |
| 6,064,876 A | 5/2000 | Ishida et al. ................. 455/412 |
| 6,065,844 A | 5/2000 | Chen ........................ 359/857 |
| 6,072,859 A | 6/2000 | Kong ..................... 379/88.16 |
| 6,078,581 A | 6/2000 | Shtivelman et al. ........ 370/352 |
| 6,091,947 A | 7/2000 | Sumner ...................... 455/413 |
| 6,094,478 A * | 7/2000 | Shepherd et al. ...... 379/211.02 |
| 6,094,573 A | 7/2000 | Heinonen et al. |
| 6,094,574 A | 7/2000 | Vance et al. ................. 455/415 |
| 6,094,575 A | 7/2000 | Anderson et al. |
| 6,101,246 A | 8/2000 | Heinmiller et al. ......... 379/142 |
| 6,104,784 A | 8/2000 | Robbins ..................... 379/45 |
| 6,104,800 A | 8/2000 | Benson ....................... 379/215 |
| 6,108,630 A | 8/2000 | Kuechler et al. ........... 704/270 |
| 6,111,939 A | 8/2000 | Brabanec ................... 379/142 |
| 6,134,235 A | 10/2000 | Goldman et al. |
| 6,134,311 A * | 10/2000 | Ekstrom ............... 379/201.01 |
| 6,137,870 A | 10/2000 | Scherer ..................... 379/127 |
| 6,137,871 A | 10/2000 | Maier et al. ................. 379/142 |
| 6,141,341 A | 10/2000 | Jones et al. ................. 370/352 |
| 6,141,409 A * | 10/2000 | Madoch et al. ........ 379/207.02 |
| 6,144,644 A | 11/2000 | Bajzath et al. ............. 370/259 |
| 6,154,531 A | 11/2000 | Clapper ..................... 379/142 |
| 6,160,876 A | 12/2000 | Moss et al. .................. 379/142 |
| 6,161,021 A | 12/2000 | Akpa ........................ 455/512 |
| 6,163,595 A | 12/2000 | Parker et al. ................. 379/22 |
| 6,163,691 A | 12/2000 | Buettner et al. ............. 455/414 |
| 6,167,254 A | 12/2000 | Chavez, Jr. et al. ........ 455/412 |
| 6,169,911 B1 | 1/2001 | Wagner et al. |
| 6,173,049 B1 | 1/2001 | Malik ........................ 379/207 |
| 6,178,232 B1 | 1/2001 | Latter et al. ............. 379/88.21 |
| 6,181,928 B1 | 1/2001 | Moon ........................ 455/415 |
| D437,879 S | 2/2001 | Weinandt .................... D18/50 |
| 6,185,289 B1 | 2/2001 | Hetz et al. ................... 379/220 |
| 6,185,426 B1 | 2/2001 | Alperovich |
| 6,192,115 B1 | 2/2001 | Toy et al. .................... 379/130 |
| 6,192,116 B1 | 2/2001 | Mayak ....................... 379/142 |
| 6,198,480 B1 | 3/2001 | Cotugno et al. ............. 345/333 |
| 6,198,920 B1 | 3/2001 | Doviak et al. ............... 455/426 |
| 6,202,023 B1 | 3/2001 | Hancock et al. |
| 6,219,407 B1 | 4/2001 | Kanevsky et al. ......... 379/88.2 |
| 6,222,826 B1 | 4/2001 | Faynberg et al. |
| 6,226,367 B1 | 5/2001 | Smith et al. ................. 379/142 |
| 6,226,369 B1 | 5/2001 | Lim et al. |
| 6,226,399 B1 | 5/2001 | Robinson |
| 6,230,006 B1 | 5/2001 | Keenan et al. .............. 455/424 |
| 6,233,325 B1 * | 5/2001 | Frech et al. ........... 379/142.06 |
| 6,236,975 B1 | 5/2001 | Boe et al. |
| 6,243,448 B1 | 6/2001 | Corbett et al. ............. 379/93.35 |
| 6,243,461 B1 | 6/2001 | Hwang ...................... 379/372 |
| 6,252,952 B1 | 6/2001 | Kung et al. ................. 379/114 |
| 6,256,671 B1 | 7/2001 | Strentzsch et al. |
| 6,262,987 B1 | 7/2001 | Mogul |
| 6,266,399 B1 | 7/2001 | Weller et al. ............. 379/88.19 |
| 6,278,704 B1 | 8/2001 | Creamer et al. |
| 6,278,862 B1 | 8/2001 | Henderson ................ 455/31.1 |
| 6,282,275 B1 | 8/2001 | Gurbani et al. ............. 379/142 |
| 6,292,479 B1 | 9/2001 | Bartholomew et al. ..... 370/352 |
| 6,292,549 B1 | 9/2001 | Lung et al. ............ 379/142.01 |
| 6,295,502 B1 | 9/2001 | Hancock et al. |
| 6,301,342 B1 | 10/2001 | Ander et al. |
| 6,301,350 B1 * | 10/2001 | Henningson et al. .. 379/220.01 |
| 6,304,644 B2 | 10/2001 | Karnowski ................ 379/156 |
| 6,310,943 B1 | 10/2001 | Kowalski ............... 379/127.03 |
| 6,311,057 B1 | 10/2001 | Barvesten .................. 455/415 |
| 6,317,488 B1 | 11/2001 | DePond et al. ........... 379/93.35 |
| 6,317,781 B1 | 11/2001 | De Boor et al. |
| 6,324,263 B1 | 11/2001 | Sherwood et al. ........ 379/88.19 |
| 6,324,271 B1 | 11/2001 | Sawyer et al. ......... 379/142.05 |
| 6,327,347 B1 | 12/2001 | Gutzmann ............... 379/88.02 |
| 6,332,021 B2 | 12/2001 | Latter et al. ............ 379/142.01 |
| 6,333,973 B1 | 12/2001 | Smith et al. |
| 6,337,979 B1 | 1/2002 | Nakayasu ................... 455/426 |
| 6,339,639 B1 | 1/2002 | Henderson ............ 379/142.08 |
| 6,341,161 B1 | 1/2002 | Latter et al. ............ 379/142.01 |
| 6,345,187 B1 | 2/2002 | Berthoud et al. ........... 455/462 |
| 6,347,136 B1 | 2/2002 | Horan ................... 379/142.01 |
| 6,351,637 B1 | 2/2002 | Lee ............................ 455/415 |
| 6,353,664 B1 | 3/2002 | Cannon et al. ........... 379/142.1 |
| 6,361,637 B2 | 3/2002 | Martin et al. |
| 6,363,140 B1 | 3/2002 | Pinard |
| 6,363,411 B1 * | 3/2002 | Dugan et al. ............... 709/202 |
| 6,363,664 B1 | 4/2002 | Brutsaert |
| 6,366,661 B1 | 4/2002 | Devillier et al. ........ 379/211.01 |
| 6,366,772 B1 | 4/2002 | Arnson ...................... 455/415 |
| 6,377,807 B1 | 4/2002 | Iparrea et al. ............... 455/445 |
| 6,377,979 B1 | 4/2002 | Yamashita et al. .......... 709/213 |
| 6,389,124 B1 | 5/2002 | Schnarel et al. ....... 379/142.01 |
| 6,400,809 B1 * | 6/2002 | Bossemeyer et al. .... 379/88.21 |
| 6,400,947 B1 | 6/2002 | Bright et al. ................ 455/433 |
| 6,404,868 B1 | 6/2002 | Beamish et al. |
| 6,404,875 B2 * | 6/2002 | Malik et al. ........... 379/211.03 |
| 6,411,692 B1 | 6/2002 | Scherer ................. 379/127.01 |
| 6,421,425 B1 | 7/2002 | Bossi et al. |
| 6,422,263 B1 | 7/2002 | Spicer |
| 6,427,003 B1 | 7/2002 | Corbett et al. ........... 379/93.35 |
| 6,427,064 B1 | 7/2002 | Henderson ................ 455/31.1 |
| 6,434,394 B1 | 8/2002 | Grundvig et al. |
| 6,437,879 B1 | 8/2002 | Temple ...................... 358/3.01 |
| 6,438,216 B1 | 8/2002 | Aktas |
| 6,438,217 B1 | 8/2002 | Huna |
| 6,438,584 B1 | 8/2002 | Powers |
| 6,442,249 B1 | 8/2002 | Miller, Jr. ................ 379/93.09 |
| 6,442,262 B1 | 8/2002 | Moss et al. ............ 379/142.02 |
| 6,442,263 B1 | 8/2002 | Beaton et al. |
| 6,442,283 B1 | 8/2002 | Tewfik et al. |
| 6,445,781 B1 | 9/2002 | Heinmiller et al. ..... 379/142.01 |
| 6,449,351 B1 | 9/2002 | Moss et al. ............ 379/142.09 |
| 6,449,361 B1 | 9/2002 | Okuda |
| 6,462,646 B2 | 10/2002 | Helferich .................... 340/72.1 |
| 6,466,653 B1 * | 10/2002 | Hamrick et al. ............ 379/67.1 |
| 6,477,246 B1 | 11/2002 | Dolan et al. |
| 6,480,589 B1 | 11/2002 | Lee et al. ............... 379/142.04 |
| 6,483,898 B2 | 11/2002 | Lew et al. ............... 379/88.12 |
| 6,493,430 B2 | 12/2002 | Leuca et al. ............ 379/88.12 |
| 6,493,431 B1 | 12/2002 | Troen-Krasnow et al. |
| 6,493,437 B1 | 12/2002 | Olshansky |
| 6,493,439 B2 | 12/2002 | Lung et al. ............ 379/142.01 |
| 6,494,953 B2 | 12/2002 | Hayes et al. ................. 118/52 |
| 6,496,569 B2 | 12/2002 | Pelletier et al. .......... 379/88.21 |
| 6,496,571 B1 | 12/2002 | Wilson .................... 379/93.23 |
| 6,496,692 B1 | 12/2002 | Shanahan |
| 6,498,841 B2 | 12/2002 | Bull et al. ............... 379/142.08 |
| 6,507,737 B1 | 1/2003 | Laham et al. ................ 455/423 |
| 6,529,500 B1 | 3/2003 | Pandharipande ............ 370/352 |
| 6,529,591 B1 | 3/2003 | Dosani et al. ......... 379/106.03 |
| 6,532,490 B1 | 3/2003 | Lewis et al. |
| 6,539,080 B1 | 3/2003 | Bruce et al. ............. 379/88.17 |
| 6,542,583 B1 | 4/2003 | Taylor .................... 379/88.02 |
| 6,542,586 B1 | 4/2003 | Helstab |
| 6,542,591 B1 | 4/2003 | Amro et al. ............ 379/142.01 |

| Patent | Date | Inventor |
|---|---|---|
| 6,542,602 B1 | 4/2003 | Elazar |
| 6,542,812 B1 | 4/2003 | Obradovich et al. |
| 6,546,092 B2 | 4/2003 | Corbett et al. ........... 379/93.35 |
| 6,549,621 B1 | 4/2003 | Christie, IV et al. |
| 6,553,110 B1 | 4/2003 | Peng .................... 379/210.03 |
| 6,553,221 B2 | 4/2003 | Nakamura et al. .......... 455/415 |
| 6,556,540 B1 | 4/2003 | Mawhinney et al. ........ 370/229 |
| 6,560,317 B1 | 5/2003 | Quagliana .................... 379/52 |
| 6,560,327 B1 | 5/2003 | McConnell |
| 6,566,995 B2 | 5/2003 | Furuuchi et al. |
| 6,570,971 B2 | 5/2003 | Latter et al. ........... 379/142.01 |
| 6,570,974 B1 | 5/2003 | Gerszberg et al. ..... 379/218.01 |
| 6,574,319 B2 | 6/2003 | Latter et al. ........... 379/142.07 |
| 6,580,904 B2 | 6/2003 | Cox et al. |
| 6,584,490 B1 | 6/2003 | Schuster et al. |
| 6,587,458 B1 | 7/2003 | Burg et al. |
| 6,590,970 B1 | 7/2003 | Cai et al. |
| 6,597,905 B1 | 7/2003 | Hijii .......................... 455/415 |
| 6,603,840 B2 | 8/2003 | Fellingham et al. |
| 6,608,891 B1 | 8/2003 | Pelletier et al. ......... 379/207.02 |
| 6,618,474 B1 | 9/2003 | Reese .................... 379/142.17 |
| 6,625,595 B1 | 9/2003 | Anderson et al. ............... 707/3 |
| 6,633,633 B1 * | 10/2003 | Bedingfield ............ 379/201.11 |
| 6,639,979 B1 | 10/2003 | Kim ...................... 379/142.06 |
| 6,650,743 B2 | 11/2003 | Heinmiller et al. .... 379/142.01 |
| 6,659,597 B2 | 12/2003 | Murata et al. |
| 6,661,785 B1 | 12/2003 | Zhang et al. ................. 370/352 |
| 6,665,388 B2 | 12/2003 | Bedingfield ............ 379/142.01 |
| 6,665,715 B1 | 12/2003 | Houri |
| 6,683,870 B1 | 1/2004 | Archer ...................... 370/356 |
| 6,687,341 B1 | 2/2004 | Koch et al. .............. 379/88.17 |
| 6,697,357 B2 | 2/2004 | Emerson, III |
| 6,701,160 B1 | 3/2004 | Pinder et al. ............. 455/550.1 |
| 6,718,021 B2 | 4/2004 | Crockett et al. ......... 379/93.23 |
| 6,721,407 B1 | 4/2004 | Michelena ............. 379/142.08 |
| 6,724,872 B1 | 4/2004 | Moore et al. |
| 6,725,872 B1 | 4/2004 | Kindell et al. |
| 6,728,355 B2 | 4/2004 | Kowalski ............... 379/142.06 |
| 6,728,360 B1 | 4/2004 | Brennan |
| 6,728,365 B1 | 4/2004 | Li et al. |
| 6,731,727 B2 | 5/2004 | Corbett et al. ........... 379/99.35 |
| 6,732,188 B1 | 5/2004 | Flockhart et al. |
| 6,738,615 B1 | 5/2004 | Chow et al. ................. 455/415 |
| 6,748,058 B1 * | 6/2004 | Schwend et al. ......... 379/88.21 |
| 6,748,068 B1 | 6/2004 | Walsh et al. ........... 379/142.03 |
| 6,751,457 B1 | 6/2004 | Martin ....................... 455/424 |
| 6,757,274 B1 | 6/2004 | Bedingfield et al. ........ 370/352 |
| 6,757,740 B1 | 6/2004 | Parekh et al. |
| 6,760,413 B2 | 7/2004 | Cannon et al. .......... 379/88.19 |
| 6,765,998 B2 | 7/2004 | Bruce et al. |
| 6,766,003 B2 | 7/2004 | Moss et al. ............. 379/142.01 |
| 6,768,792 B2 | 7/2004 | Brown et al. ........... 379/207.14 |
| D494,953 S | 8/2004 | Leung .................... D14/141.3 |
| 6,771,754 B2 | 8/2004 | Pelletier et al. ......... 379/142.01 |
| 6,771,755 B1 | 8/2004 | Simpson ................ 379/142.04 |
| 6,771,956 B1 | 8/2004 | Beller ........................ 455/423 |
| 6,775,366 B1 | 8/2004 | Cobbett et al. |
| 6,775,540 B2 | 8/2004 | Iyer ........................ 455/422.1 |
| 6,778,524 B1 | 8/2004 | Augart |
| 6,779,020 B1 | 8/2004 | Henrick |
| 6,785,301 B1 | 8/2004 | Chapman et al. ........... 370/522 |
| 6,785,368 B1 | 8/2004 | Eason et al. ............. 379/88.19 |
| 6,785,540 B1 | 8/2004 | Wichelman ................. 455/423 |
| 6,792,266 B1 | 9/2004 | Masuda et al. |
| 6,798,841 B2 | 9/2004 | Hansen |
| 6,798,879 B1 | 9/2004 | Beham |
| 6,807,267 B2 | 10/2004 | Moss et al. ............. 379/207.15 |
| 6,810,077 B1 | 10/2004 | Dezonno .................... 375/222 |
| 6,810,115 B2 | 10/2004 | Fukuda .................. 379/142.01 |
| 6,813,344 B1 | 11/2004 | Lemke |
| 6,816,481 B1 | 11/2004 | Adams et al. .............. 370/352 |
| 6,818,474 B2 | 11/2004 | Kim et al. |
| 6,826,271 B1 | 11/2004 | Kanabar et al. ......... 379/212.01 |
| 6,826,617 B1 | 11/2004 | Ansell et al. |
| 6,830,595 B2 | 12/2004 | Reynolds, III |
| 6,831,974 B1 | 12/2004 | Watson et al. .......... 379/265.02 |
| 6,842,512 B2 | 1/2005 | Pedersen ................ 379/142.01 |
| 6,845,151 B2 | 1/2005 | Peng ...................... 379/142.06 |
| 6,845,512 B2 | 1/2005 | Horng et al. |
| 6,853,710 B2 | 2/2005 | Harris |
| 6,853,711 B2 | 2/2005 | Brisebois et al. ....... 379/142.06 |
| 6,856,677 B2 | 2/2005 | Leijonhufvud |
| 6,859,527 B1 | 2/2005 | Banks et al. |
| 6,865,266 B1 | 3/2005 | Pershan .................. 379/221.13 |
| 6,865,384 B2 | 3/2005 | Sagi et al. |
| 6,868,155 B1 | 3/2005 | Cannon et al. ......... 379/376.01 |
| 6,871,076 B2 | 3/2005 | Samn |
| 6,888,927 B1 | 5/2005 | Cruickshank et al. .... 378/88.11 |
| 6,888,972 B2 | 5/2005 | Berg et al. |
| 6,891,940 B1 | 5/2005 | Bhandari et al. |
| 6,898,275 B2 | 5/2005 | Dolan et al. |
| 6,904,276 B1 | 6/2005 | Freeman et al. |
| 6,907,034 B1 | 6/2005 | Begis |
| 6,909,777 B2 | 6/2005 | Latter et al. |
| 6,914,953 B2 | 7/2005 | Boerstler |
| 6,922,411 B1 | 7/2005 | Taylor |
| 6,928,154 B1 | 8/2005 | Cheaito et al. |
| 6,931,007 B2 | 8/2005 | Jones |
| 6,947,531 B1 | 9/2005 | Lewis et al. |
| 6,952,469 B2 | 10/2005 | Han |
| 6,970,546 B2 | 11/2005 | Kent, Jr. et al. |
| 6,977,993 B2 | 12/2005 | Starbuck et al. |
| 6,996,211 B2 | 2/2006 | Reynolds et al. |
| 7,012,999 B2 | 3/2006 | Ruckart |
| 7,016,482 B2 | 3/2006 | Moss et al. |
| 7,027,408 B2 | 4/2006 | Nabkel et al. |
| 7,027,569 B2 | 4/2006 | Price |
| 7,076,051 B2 | 7/2006 | Brown et al. |
| 7,079,837 B1 | 7/2006 | Sherman et al. |
| 7,085,358 B2 | 8/2006 | Ruckart et al. |
| 7,095,715 B2 | 8/2006 | Buckman et al. |
| 7,097,169 B2 | 8/2006 | Mueller |
| 7,103,167 B2 | 9/2006 | Brahm et al. |
| 7,113,577 B2 | 9/2006 | Cook et al. |
| 7,152,118 B2 | 12/2006 | Anderson, IV et al. |
| 7,155,211 B2 | 12/2006 | Mun et al. |
| 7,184,533 B1 | 2/2007 | Shaffer et al. |
| 7,228,129 B1 | 6/2007 | Ward et al. |
| 2001/0002209 A1 | 5/2001 | Han |
| 2001/0005854 A1 | 6/2001 | Murata et al. |
| 2001/0036174 A1 | 11/2001 | Herring |
| 2001/0044898 A1 | 11/2001 | Benussi et al. |
| 2001/0048737 A1 | 12/2001 | Goldberg et al. |
| 2002/0009184 A1 | 1/2002 | Shnier .................... 379/142.01 |
| 2002/0016748 A1 | 2/2002 | Emodi et al. |
| 2002/0041605 A1 | 4/2002 | Benussi et al. |
| 2002/0055926 A1 | 5/2002 | Dan et al. |
| 2002/0067816 A1 | 6/2002 | Bushnell ................. 379/201.02 |
| 2002/0077102 A1 | 6/2002 | Achuthan et al. ........... 455/435 |
| 2002/0082050 A1 | 6/2002 | Mountney et al. .......... 455/560 |
| 2002/0085687 A1 | 7/2002 | Contractor et al. |
| 2002/0090933 A1 | 7/2002 | Rouse et al. ................ 455/412 |
| 2002/0094826 A1 | 7/2002 | Lee .......................... 455/457 |
| 2002/0118812 A1 | 8/2002 | Contractor |
| 2002/0119430 A1 | 8/2002 | Szynalski |
| 2002/0120629 A1 | 8/2002 | Leonard |
| 2002/0122401 A1 | 9/2002 | Xiang et al. |
| 2002/0125929 A1 | 9/2002 | Chen et al. |
| 2002/0183098 A1 | 12/2002 | Lee et al. ................... 455/566 |
| 2002/0188443 A1 | 12/2002 | Reddy et al. ............... 704/231 |
| 2002/0191755 A1 | 12/2002 | Lew et al. ............... 379/88.12 |
| 2002/0197991 A1 | 12/2002 | Anvekar et al. |
| 2003/0007620 A1 | 1/2003 | Elsey et al. ............ 379/218.01 |
| 2003/0012353 A1 | 1/2003 | Tang et al. |
| 2003/0016143 A1 | 1/2003 | Ghazarian |
| 2003/0016800 A1 | 1/2003 | Fukuda |

| | | |
|---|---|---|
| 2003/0021290 A1 | 1/2003 | Jones |
| 2003/0026413 A1 | 2/2003 | Brandt et al. .............. 379/230 |
| 2003/0026416 A1 | 2/2003 | Fusco |
| 2003/0032414 A1 | 2/2003 | Melaku et al. |
| 2003/0050100 A1 | 3/2003 | Dent |
| 2003/0053602 A1 | 3/2003 | Stuckman et al. |
| 2003/0063730 A1 | 4/2003 | Woodring |
| 2003/0063731 A1 | 4/2003 | Woodring |
| 2003/0068020 A1 | 4/2003 | Hamrick et al. |
| 2003/0092384 A1 | 5/2003 | Ross, III ..................... 455/41 |
| 2003/0092432 A1 | 5/2003 | Hwang |
| 2003/0095650 A1 | 5/2003 | Mize ..................... 379/142.17 |
| 2003/0112938 A1 | 6/2003 | Kanakubo et al. |
| 2003/0119503 A1 | 6/2003 | Shohara et al. ............. 455/434 |
| 2003/0133553 A1 | 7/2003 | Khakoo et al. ........ 379/142.01 |
| 2003/0133653 A1 | 7/2003 | Barros et al. |
| 2003/0135562 A1 | 7/2003 | Himmel et al. |
| 2003/0135626 A1 | 7/2003 | Ray |
| 2003/0148758 A1 | 8/2003 | McMullin |
| 2003/0152207 A1 | 8/2003 | Ryan |
| 2003/0187949 A1 | 10/2003 | Bhatt et al. ................. 709/218 |
| 2003/0196206 A1 | 10/2003 | Shusman |
| 2003/0198322 A1 | 10/2003 | White, Jr. ................ 379/88.19 |
| 2003/0219107 A1 | 11/2003 | Richardson et al. |
| 2004/0049545 A1 | 3/2004 | Lockridge et al. |
| 2004/0101118 A1 | 5/2004 | Powell .................... 379/142.1 |
| 2004/0101124 A1 | 5/2004 | Koch et al. |
| 2004/0109558 A1 | 6/2004 | Koch .................... 379/373.01 |
| 2004/0114730 A1 | 6/2004 | Koch et al. |
| 2004/0120475 A1 | 6/2004 | Bauer et al. |
| 2004/0125929 A1 | 7/2004 | Pope ..................... 379/142.17 |
| 2004/0171370 A1 | 9/2004 | Natarajan ................... 455/413 |
| 2004/0181587 A1 | 9/2004 | Cao et al. ................... 709/206 |
| 2004/0192332 A1 | 9/2004 | Samn |
| 2004/0202298 A1 | 10/2004 | Lopez et al. |
| 2004/0202299 A1 | 10/2004 | Schwartz |
| 2004/0208301 A1 | 10/2004 | Urban et al. |
| 2004/0208302 A1 | 10/2004 | Urban et al. ........... 379/142.17 |
| 2004/0209604 A1 | 10/2004 | Urban et al. ................ 455/415 |
| 2004/0209605 A1 | 10/2004 | Urban et al. ................ 455/415 |
| 2004/0209640 A1 | 10/2004 | Urban et al. ............. 455/550.1 |
| 2004/0213207 A1 | 10/2004 | Silver et al. |
| 2004/0233892 A1 | 11/2004 | Roberts et al. |
| 2004/0242212 A1 | 12/2004 | Bacon et al. |
| 2004/0248560 A1 | 12/2004 | Bedingfield et al. |
| 2005/0073999 A1 | 4/2005 | Koch |
| 2005/0100158 A1 | 5/2005 | Kreiner et al. |
| 2005/0107074 A1 | 5/2005 | Zellner |
| 2005/0147228 A1 | 7/2005 | Perrella et al. |
| 2006/0002540 A1 | 1/2006 | Kreiner et al. |
| 2006/0013375 A1 | 1/2006 | Smith et al. |
| 2006/0029209 A1 | 2/2006 | Morton et al. |
| 2006/0152207 A1 | 7/2006 | Riebel et al. |
| 2006/0153173 A1 | 7/2006 | Beck et al. |
| 2007/0064911 A1 | 3/2007 | Bedingfield, Sr. et al |

FOREIGN PATENT DOCUMENTS

| | | |
|---|---|---|
| KR | 2002014945 | 2/2002 |
| WO | WO 97/50225 | 12/1997 |
| WO | 03/030501 A1 | 4/2003 |
| WO | 03/030502 A1 | 4/2003 |
| WO | 03/090432 A1 | 10/2003 |

OTHER PUBLICATIONS

U.S. Appl. No. 10/174,566, filed Jun. 18, 2002, Bedingfield, J.C. et al.
U.S. Appl. No. 09/812,338, filed Mar. 19, 2001, Clayton Smith.
U.S. Appl. No. 10/144,555, filed May 13, 2002, Scott C. Holt et al.
U.S. Appl. No. 10/200,874, filed Jun. 23, 2002, David A. Scott et al.
U.S. Appl. No. 10/200,906, filed Jun. 23, 2002, David A. Scott et al.
U.S. Appl. No. 10/201,706, filed Jun. 23, 2002, David A. Scott et al.
U.S. Appl. No. 10/891,883, filed Jun. 15, 2004, Donald Scott Smith et al.
U.S. Appl. No. 09/992,165, filed Nov. 6, 2001, Sherman, S. et al.
U.S. Appl. No. 10/201,042, filed Jun. 23, 2002, David A. Scott et al.
U.S. Appl. No. 10/144,556, filed May 13, 2002, Scott C. Holt et al.
U.S. Appl. No. 10/200,906, filed Jul. 23, 2002, David A. Scott.
U.S. Appl. No. 10/152,544, filed May 21, 2002, Alston, D.B.
U.S. Appl. No. 10/032,724, filed Dec. 27, 2001, Moton, R.B.
Boswell, J. et al., "An Advanced HF Receiver Design", *IEE, HF Radio Systems and Techiques*, 1994, 392, 41-47.
Egevang, K. et al., "The IP Network Address Translator(NAT)", May 1994, 8 pages.
Norris, M.H., "Transmitter Architectures", *The Institute of Electrical Engineers*, 1998, 4/1 thru 4/6.
Rekhter, Y. et al., "Address Allocation for Private Internets", Feb. 1996, 8 pages.
Slawson, M.W., "Caller ID Basics", Oct. 31, 2001, http://www.testmark.com/develop/tml_callerid_cnt.html, 10 pages.
"RBS 884 PICO System Descriptions", Ericsson 1/1551-AE/LZB 119 2269 Uae Rev A, Apr. 23, 1998, Author Unknown, 2-1 thru 2-28.
Voice-6090, "Talking Caller ID", Aastra Telecom-Talking Caller ID Voice 9090, http://www.aastra.com/products/callerids/voicecallerid/be6060.html, Aug. 15, 2005, 2 pages.
Voice-9090, "Talking Caller ID", Aastra Telecom-Talking Caller ID Voice 9090, http://www.aastra.com/products/callerids/voicecallerid/be9090.html, Aug. 15, 2005, 2 pages.
OKI Silicon Solutions Company, Japan Site, "Multi Lingual Test-to-Speech Processor ML2110", http://www.oki.com/semi/english/ml2110/html, Aug. 15, 2005, 5 pages.
"Talking Caller ID with Call Waiting", Smarthome, http://www.Smarthome.com/5154.html, Aug. 15, 2005, 2 pages.
"Talking Caller ID-Caller ID Software featuring Talking, Paging, Email, Voice Mail, Blocking, Text-to-Speech", Stealth Software, Aug. 15, 2005, http://www.talkingcallerid.com, 4 pages.
LSSGR LATA Switching Systems Generic Requirements, CLASSSM Feature: Calling Name Delivery Generic Requirements, *BellCore Specification*, Technical Reference (TR-NWT-001188), Dec. 1991, 1, 103 pages.
LSSGR LATA Switching Systems Generic Requirements, CLASS Feature: Calling Number Delivery, *BellCore Specification*, Technical Reference (TR-NWT-000031), Dec. 1992, Issue 4, 32 pages.
Handley, M. et al., "SIP: Session Initiation Protocol", Mar. 1999, http://www.ietf.org/rfc/rfc2543, 143 pages.
U.S. Appl. No. 10/174,566, filed Mar. 19, 2001, which is available in the USPTO'S Image File Wrapper System.
U.S Appl. No. 10/746,804, filed Dec. 24, 2003, which is available in the USPTO's Image File Wrapper System.
International Search Report, PCT/US02/29988, Sep. 23, 2002.
International Search Report, PCT/US02/30068, Dec. 9, 2002.

* cited by examiner

SYSTEM AND METHOD FOR AUDIO CALLER IDENTIFICATION SERVICE

FIELD OF THE INVENTION

The present invention relates to the field of telecommunications. More particularly, the present invention relates to telephone caller identification systems.

BACKGROUND OF THE INVENTION

In recent years, a number of new telephone service features have been provided by an Advanced Intelligent Network (AIN). The AIN evolved out of a need to increase the capabilities of the telephone network architecture in order to meet the growing needs of telephone customers or users. The AIN architecture generally comprises two networks, a data messaging network and a circuit-switched, trunked communications network. The trunked communications network handles voice and data communications between dispersed network locations, whereas the data messaging network is provided for controlling operations of the trunked communications network.

Calling Number Identification and "Caller ID" are common names for AIN subscriber services that identify the telephone line from which an incoming call originates. Generally, Caller ID provides the called party with a visual alphanumeric display of the calling party's name and/or telephone number on a Caller Line Identity Display (CLID). This service has become very popular in today's telecommunications market due to subscribers' desire for increased privacy and control. By providing the called party with the identity of the calling party upon receipt of an incoming call, the called party can selectively field incoming calls.

Typically, mobile phone users pay for mobile phone usage including incoming calls. Hence, mobile phone users are likely to subscribe to Caller ID services, such as calling number ID and caller name ID to screen incoming calls, if such a service is available. Mobile phone users who subscribe to Caller ID may find it difficult to read the visual calling name/number data on the cellular phone display, especially while involved in other activities, such as driving. Hence, it is helpful for mobile phone users to receive Caller ID information audibly, rather than visually, so as not to be distracted from other activities.

Traditional wired telephone users as well may find it useful to have an audio caller identification service. Persons who have vision difficulties or who have to keep their eyes on what they are doing may find an audio caller identification system extremely helpful. Additionally, a customer with a cordless phone or several handsets may find it inconvenient to go to the location of a CLID, which may be in another room, to see who is calling. Such users may find it more convenient to receive Caller ID information audibly at the telephone handset.

To accommodate mobile phone users and to address the limitations of visual Caller ID services, there have been proposed systems for audio Caller ID. Existing audio Caller ID systems, however, are limited by relying on technology used by visual Caller ID systems. Visual Caller ID information is limited by the display characteristics of the CLID to 15 characters in length, which is sometimes insufficient to completely and uniquely identify the calling party. Hence, existing audio Caller ID systems, relying on existing visual Caller ID technology, are similarly limited to 15 characters of information, resulting in frequent truncation of names. It would be a great advantage, therefore, if an audio Caller ID system provided more than 15 characters of information to be converted to speech so that names or other data would not be truncated, allowing a calling party to be completely and uniquely identified.

Additionally, in existing audio Caller ID services, for those subscribing to both visual Caller ID and Audio Caller ID, the calling number information displayed on the CLID is incorrect. Rather than displaying the number from which the call was placed, the CLID displays the number of the services node used to complete the call. It would be a great advantage if the correct information would be displayed on the CLID for those who subscribe to both visual and audio Caller ID.

The present invention is directed to an improved audio Caller ID system. Specifically, the present invention is directed to remedying both the truncation of identification information and the incorrect display of the calling party number on the CLID.

SUMMARY OF THE INVENTION

In the present invention, the aforementioned need is satisfied by a system that is employed in combination with an AIN-based telephone network having a service control point (SCP), a database of information associated with the SCP, in which the database includes at least 50 characters of data for customer name, and a services node (SN). The audio Caller ID service is initiated when a calling party calls a subscriber to the service. The calling party hears normal ringing while the service places a second call to the called party. When the called party answers the telephone, the service provides an audible announcement containing information regarding the calling party such as the calling party's name, city and state, or the calling party's telephone number. If the called party accepts the call, the parties are connected. If the called party rejects the call, the call may be forwarded to the called party's voicemail or the ringing signal may be continued at the calling party handset until a ring timer expires. A nationwide customer name database structure comprised, for example, of interconnected regional databases, could be utilized, making it possible to announce any caller's name within the United States.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments that are presently preferred. As should be understood, however, the invention is not limited to the precise arrangements and instrumentalities shown. In the drawings.

Figure 1:
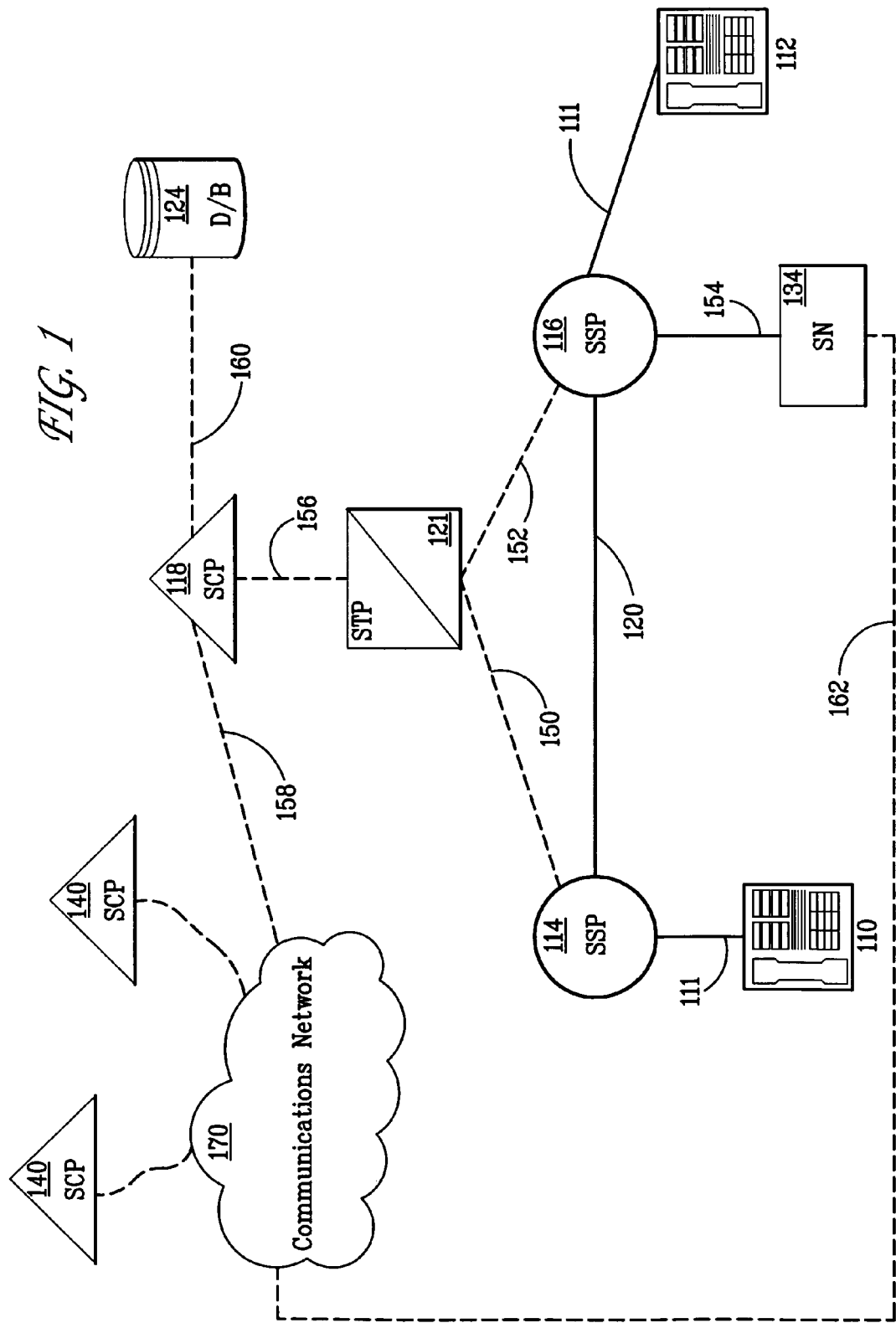
FIG. 1 illustrates, in a general block diagram form, an Advanced Intelligent Network (AIN) based system for implementing intelligent network management features, such as those which may be employed in connection with the present invention.

The present invention is further described in the detailed description that follows, by reference to the noted plurality of drawings by way of non-limiting examples of preferred embodiments of the present invention, in which like reference numerals represent similar parts throughout the several views of the drawings.

DETAILED DESCRIPTION OF THE PREFERRED EMBODIMENTS

Advanced Intelligent Network (AIN) System

Referring now to the figures, a preferred embodiment of the systems and methods of the present invention will be described. Basic telephony concepts and terminology are used throughout the description as would be understood by one of skill in the art.

Referring now to FIG. 1, there is shown an exemplary telecommunication network. This exemplary environment is the public switched telecommunications network (PSTN). A portion of the PSTN is illustrated in FIG. 1 and is generally described below.

According to an aspect of the present invention, systems and methods for audio caller identification may be implemented for an AIN or AIN-type network using a computer telephony system. AIN systems are described in U.S. Pat. No. 5,701,301, which is incorporated herein by reference in its entirety. In particular, an AIN network with advanced intelligent network capabilities may be utilized to implement the various features and aspects of the invention. It should be noted, however, that the implementation of the present invention is not limited to AIN-based networks and other advanced or intelligent networks and arrangements may be used to implement the invention.

Referring now to the accompanying drawings, FIG. 1 illustrates a simplified AIN-based network arrangement incorporating the various features of the invention, as further described below. The AIN includes a variety of interconnected network elements. A group of such network elements includes a plurality of central offices (COs) 114, 116 capable of generating AIN queries, also called service switching points (SSPs). A central office or SSP is a switch and the terms are used interchangeably herein. SSPs 114 and 116 may comprise, for example DMS100 or 5ESS switches. These switches may be manufactured by, for example, Lucent Technologies, Inc. or Nortel Networks. As further illustrated in FIG. 1, SSPs 114, 116 have a plurality of subscriber lines 111 connected thereto. Each SSP serves a designated group of subscriber lines, and thus, the SSP 114 or 116 that serves a particular line may be referred to as its serving switch. Each line is connected typically to a piece of terminating equipment including a plurality of telephones designated, e.g., as 110, 112. Although telephones are illustrated as the pieces of terminating equipment in FIG. 1, those skilled in the art will understand that such pieces include other telecommunications devices such as facsimile machines, computers, modems, etc.

In the embodiment of FIG. 1, the system includes a first telephone station which for illustrative purposes will be referred to as telephone station 110 and a second telephone station 112. SSPs 114, 116 are interconnected by a plurality of trunk circuits 120. These are the voice path trunks that interconnect the SSPs to connect communications. The term "communication" or "call" is used herein to include all messages that may be exchanged between caller and called party in the network illustrated in FIG. 1. Trunk 120 may be either a SS7 controlled multi-frequency trunk (MF), or primary rate interface (PRI) trunk and the type of trunk will be in accordance with both the sending and receiving SSP to which it is connected.

In the example shown in FIG. 1, each switch may include different types of facilities and/or triggers. SSPs 114 and 116 are each programmable switches which may perform the following functions: recognize AIN-type calls, launch queries to service control point (SCP) 118, and receive commands and data from, for example, SCP 118 to further process and route AIN-type calls. When one of SSPs 114, 116 is triggered by an AIN-type call, the triggered SSP 114, 116 formulates and sends an AIN query. Based on the reply from the AIN type call, SSP 114, 116 responds to call processing instructions from the network element in which the AIN service logic resides. According to an aspect of the invention, the AIN service logic may reside at SCP 118.

Each of SSPs 114, 116 is connected to a signal transfer point (STP) 121 via respective data links 150, 152. In one embodiment, these are data links employing a signaling protocol referred to as Signaling System 7 (SS7), which is well-known to those skilled in the art, although it should be understood that any other suitable protocol could be employed without departing from the spirit and scope of the invention.

In order to facilitate signaling and data messaging, each SSP 114, 116 may be equipped with Common Channel Signaling (CCS) capabilities, e.g., SS7, which provides two-way communications of data messages over CCS links 150 and 152 between components of the AIN network. The data messages may be formatted in accordance with the Transaction Capabilities Applications Part (TCAP). Alternatively, Integrated Service Digital Network, (ISDN) Users Part (ISUP) may be used for signaling purposes between, for example, SSPs 114 and 116. In such a case, SSPs 114 and 116 may be equipped with the capability to map appropriate data between TCAP and ISUP protocols, and vice versa. The telephone network essentially employs an upper-level software controlled network through the STPs 121 and SCPs 118.

AIN SSPs 114 and 116 may allow normal switch processing to be suspended at specific points in a call so that the switch may send an AIN message query via signaling transfer point (STP) 121 to SCP 118. SCP 118 may execute software based service logic and return call-processing instructions to the triggering AIN SSP. New services may be provisioned by assigning AIN SSP triggers to customer lines, trunks, and/or North American Numbering Plan (NANP) telephone numbers.

Much of the intelligence of the AIN resides in a type of AIN element referred to as a service control point (SCP) 118 that is connected to STP 121 over an SS7 or other suitable data link 156. Among the functions performed by SCP 118 is the hosting of network databases which may be stored in database object 124. Database object 124 is shown as a database communicatively coupled to SCP 118, although data storage object 124 may be embodied as a component within SCP 118, such as an internally-mounted hard disk device. The databases stored in data storage object 124 may be used in providing telecommunications services to a customer. Typically, SCP 118 is also the repository of service package applications (SPAs) that are used in the application of telecommunications services, enhanced features, or subscriber services to calling lines. Additionally, SPAs may use databases for providing telecommunication services.

A set of triggers may be defined at SSPs 114, 116. A trigger in the AIN is an event associated with a particular call that initiates a query to be sent to SCP 118. The trigger may cause SCP 118 to access processing instructions with respect to the particular call. The results of processing at SCP 118, which may include database inquiries, are sent back to SSP 114, 116 through STP 121. The return packet may include instructions to SSP 114, 116 as to how to process the call. The instructions may be to take some special action as a result of a customized calling service, enhanced feature, or subscriber service. In response, SSP 114, 116 may move through its call states, and generate further packets that are used to set up and route calls. Similar devices for routing calls among various local exchange carriers are provided by regional STP and regional SCP.

An example of such a trigger is a termination attempt trigger (TAT), which causes a query to be sent to SCP 118 whenever an attempt is made to terminate a call. Another type of trigger that may be used is a Public Office Dialing Plan (PODP) trigger although other suitable triggers may be used.

The system of FIG. 1 may also include services circuit node (SCN) 134, which may also be referred to herein as services node (SN) 134. SN 134 is a programmable interactive data system that can act as a switch to transfer calls. SN 134 may provide interactive help, collect voice information from participants in a call, provide notification functions and/or store subscriber data. SN 134 may be a Lucent Technologies Star Server FT Model 3200 or Model 3300 although other units may be employed without departing from the scope of the invention. SN 134 may include voice and dual multi-frequency (DTMF) signal recognition devices and voice synthesis devices. In addition, SN 134 may include a data assembly interface. In addition, SN 134 may request SCP 118 to retrieve information from database 124 containing information concerning calling party 110, may receive information from SCP 118, may make outgoing calls to subscriber station 112, may convert alphanumerical textual data to speech, may announce converted information retrieved from SCP 118 to subscriber station 112 and/or may connect telephone station 110 to subscriber station 112. Communications link 154 between SSP 116 and SN 134 may be a primary rate interface (PRI) or basic rate interface (BRI) line or any other suitable telephone line. PRI and BRI lines are circuit-switched ISDN lines. SN 134 and network 170 may be communicatively coupled via data link 162 using an X25, TCP/IP or SS7 protocol or any other suitable protocol.

Accordingly, connections by links 150, 152, 156, 158 and 162 are for signaling purposes and allow SSPs 114 and 116 to send and receive messages to and from SCP 118 and SN 134. For purposes of illustration, various features of the present invention will now be described from the standpoint of a switch implementing AIN protocols, provisioned with TAT (termination attempt trigger), or PODP (public office dialing plan) triggers. However, as will be apparent to those of ordinary skill in the art based on the disclosure provided herein, the present invention is not limited to implementation through these particular triggers and protocols and may be designed and provisioned with a network utilizing other triggers and protocols. For example, SSP 114 and/or 116 may represent a TCP/IP telecommunications switching network gateway. One skilled in the art will further recognize that the above-described network is a simplified network meant for explanatory purposes. It is likely that a telephone network may comprise numerous user stations, SSPs, STPs, SCPs, and SNs along with other telephone network elements.

Existing Audio Caller ID Systems

In existing audio Caller ID systems, telephone station 110 (the calling party) having for example telephone number (215) 555-9999, places a call to subscribing station 112, (the called party). SSP 114 halts processing and sends a message to SCP 118, requesting instructions. The message contains Caller ID information concerning telephone station 110 including the telephone number of telephone station 110, (215) 555-9999. SCP 118 instructs SSP 114 to route the call to an incoming line (for example, (215) 555-0001) of a services node SN 134. SN 134 places a call through an outgoing line (for example, (215) 555-0002) to the called party. SSP uses (215) 555-0002 as the calling number. When subscriber station 112 (called party) answers the call, the SN 134 announces the 15-character identification information retrieved from a database containing 15 characters of textual data. SN 134 translates the 15 characters of textual data to speech using well-known text-to-speech conversion processes. Because the call was placed by SN 134, the telephone number displayed on the Caller Line Identity Display (CLID) will be the number of the outgoing line of SN 134, (215) 555-0002, instead of the number of telephone station 110 (the calling party), (215) 555-9999.

Improved and Extended Audio Caller ID System

According to one aspect of the invention, a system for providing an improved audio caller identification service within the AIN or AIN-type environment is provided. Requests for calling party information such as caller identification are served by the AIN telephone network such that a called party that subscribes to the audio caller identification service will hear an audible announcement containing information associated with the calling party and is provided with an opportunity to accept or reject the call before the connection with the calling party is made.

The Audio Caller ID service checks the call route and the availability of connection. If the called number is inactive or busy, the appropriate treatment is applied (e.g., announcement, voice mail or busy tone). If the called number is a landline number, SCP 118 queries the destination switch to determine the state of the line. If the called number is a wireless number, a wireless protocol including but not limited to TIA/EIA-41 or GSM may be used to send a message to the wireless network to determine the state of the wireless handset. If the called number is unavailable the call is completed, allowing the destination switch 116 to provide the correct announcement or tone. If the called number is active or available, telephone station 110 (the calling party) begins to hear normal ringing.

For example, if telephone station 110 (the calling party) places a call to a subscribing station 112, (the called party), the call is suspended while SSP 114, using routing instructions provided by SCP 118 and SN 134, places a second call to subscribing station 112 (the called party). Unlike existing systems, a Custom Dialing Plan (CDP) or Feature Code trigger causes the correct calling number (the telephone number of telephone station 110), to replace the number of SN 134 ((215) 555-0002, in the example) that in existing systems would be displayed on a Caller Line Identity Display (CLID). Hence, in accordance with the present invention, the telephone number of telephone station 110 (the calling party) will be displayed on the CLID for subscribers of both visual Caller ID and Audio Caller ID. For more information concerning the use of Custom Dialing Plan or Feature Code triggers, U.S. Pat. No. 5,991,377, titled "System and Method for Manipulating Data Fields in a Call Structure for Synchronizing Billing Information and Retaining Original Calling Party Information," filed Nov. 23, 1999, and U.S. patent application Ser. No. 09/468888, titled "Method and System for Providing Calling Number Restoral", filed Dec. 22, 1999, which are herein incorporated by reference, can be reviewed.

The Audio Caller Identification system is initiated when a caller calls a wireless or landline subscriber. The service first checks to determine whether the called number is inactive or busy, in which case the appropriate treatment is applied, for example.

Upon determining that subscriber station 112 is available, SCP 118 instructs SSP 114 to route the call to SN 134 and telephone station 110 receives a ringing signal. Information associated with telephone station 110 (the calling party) in a preferred embodiment is retrieved from a database 124 stored on or associated with SCP 118. Database 124 comprises data such as, but not limited to, customer name. Customer name, or other data, such as, but not limited to, pronunciation codes or wave files can be at least 50 characters in length or the equivalent thereof. Upon retrieval of data associated with telephone station 110, subscribing station 112 receives a ringing signal. When subscribing station 112 answers the call, SN 134 audibly announces information associated with telephone station 110 (the calling party) to subscriber station 112 (the called party). Subscriber station 112 (the called party) receives an audible message asking for a response and is provided with an opportunity to accept or reject the call. If subscriber station 112 (the called party) elects to accept the call, SN 134 connects telephone station 110 (the calling party) with subscriber station 112 (the called party). If subscriber station 112 (the called party) elects to reject the call, SN 134 directs the call to a voice mailbox of subscriber station 112 or, if subscriber station 112 has no voice mailbox, telephone station 110 continues to receive a ringing signal until a ring timer expires, at which time the call is ended (terminated).

The Audio Caller ID service checks the call route and the availability of connection. If the called number is inactive or busy, the appropriate treatment is applied (e.g., announcement, voice mail or busy tone). If the called number is a landline number, SCP 118 queries the destination switch to determine the state of the line. If the called number is a wireless number, a wireless protocol including but not limited to TIA/EIA-41 or GSM may be used to send a message to the wireless network to determine the state of the wireless handset. If the called number unavailable the call is completed, allowing the destination switch 116 to provide the correct announcement or tone. If the called number is active or available, telephone station 110 (the calling party) begins to hear normal ringing.

Figure 2:
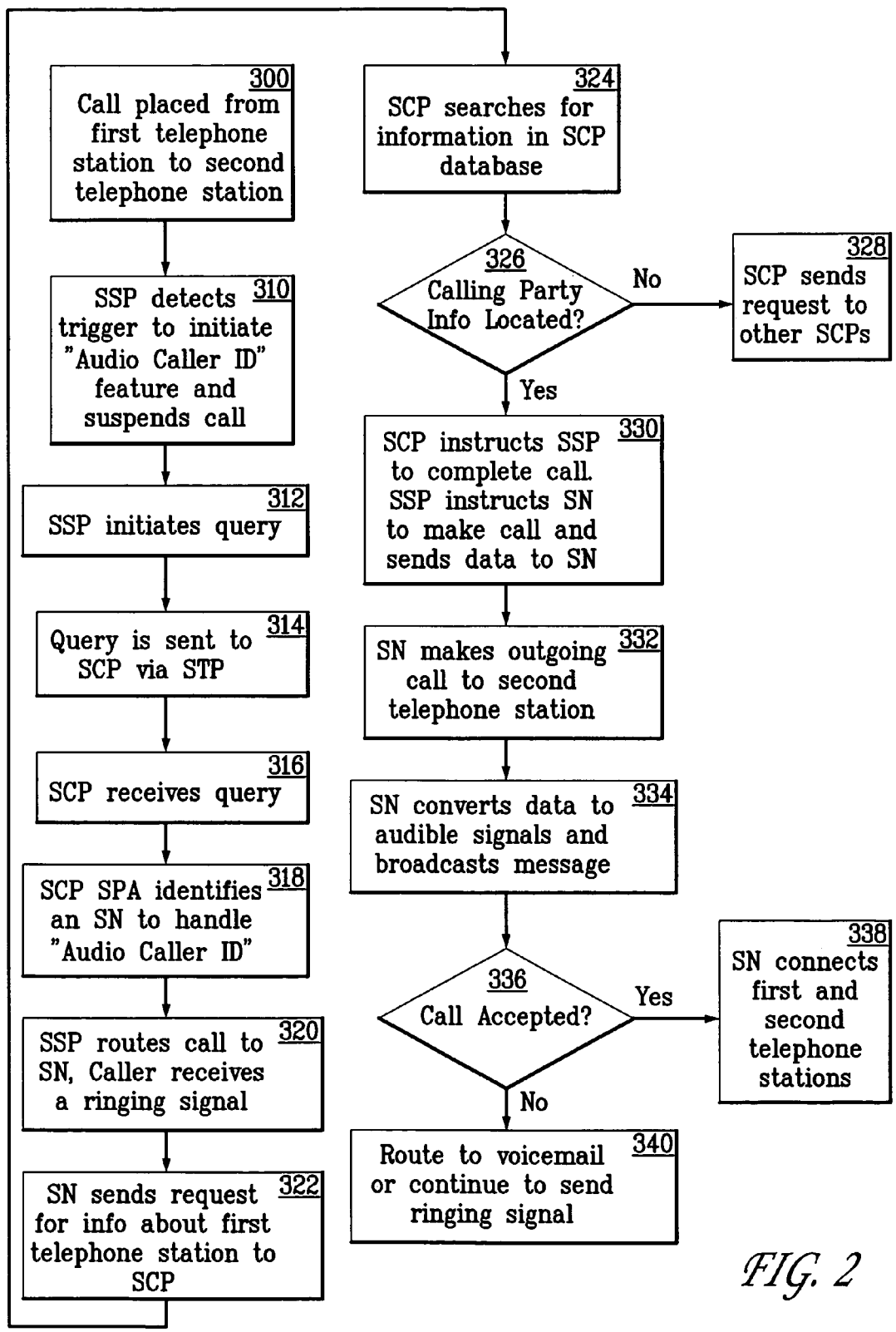
FIG. 2 is a flowchart of a process for providing audio caller information in accordance with an aspect of the present invention.

Referring now to FIG. 2, there is illustrated an exemplary overview of the call flow logic according to an aspect of the present invention. The call flow for the audio caller identification service begins when, at step 300, an operator at telephone station 110 (the calling party) places a call to subscriber station 112 (the called party). The call is routed over the telephone network via normal procedures. At step 310, SSP 114 detects the request for the audio caller identification service and suspends the call.

At step 312, SSP 114 initiates a query associated with the audio caller identification service. At step 314, the query is routed to SCP 118 via STP 121. The query is directed to identifying a services node (SN) to handle the audio caller identification request. In one embodiment, the selection of an SN to handle the request is determined based upon the identity of the subscriber station 112 (the called party). Accordingly, the query contains information identifying telephone station 110 (the calling party) and subscriber station 112 (the called party).

At step 316, SCP 118 receives the query and at step 318, SCP 118 responds to the query by launching an instance of a logic program that is referred to herein as a service package application (SPA). SPA queries database 124 located at SCP 118 using the information contained in the query. Specifically, the application uses the information identifying telephone station 112 to resolve which services node will handle the audio caller identification request.

Database 124 at SCP 118 designates SN 134 as responsible for handling the call. At step 318, SCP 118 transmits instructions for handling the audio caller identification request to SSP 114. The instructions include information that identifies SN 134 as responsible for handling the audio caller information service. In a preferred embodiment, SCP 118 instructs SSP 114 to route the call to a Multi Line Hunt Group (MLHG) number or Access Dial Number (DN), for example line (215) 555-0001 on SN 134.

At step 320, SSP 114 routes the call to SSP 116 and SSP 116 routes the call to SN 134. At this point a ringing signal is heard at telephone station 110 (the calling party). Routing from SN 114 to SN 134 is based on services node information sent by SCP 118. At step 322, SN 134 accepts the call from SSP 110, placing SN 134 in communication with telephone station 110 (the calling party) and sends a message to SCP 118 using X-25, SS7 or TCP/IP protocols to retrieve information associated with telephone station 110 (the calling party). In response, at step 324, the SCP attempts to retrieve information contained in a CNAM (Customer Name) database 124 associated with SCP 118. Database 124 may contain 50 characters of data or more associated with telephone station 110. If, at step 326, the retrieval is successful (information associated with the telephone number of the calling party 110 is found in database 124), SCP 118 sends the retrieved information to SN 134 at step 330.

If, however, no information associated with telephone station 110 was found in database 124, at step 328, SCP 118 sends a request to other SCPs 140 over communications network 150 for information associated with telephone station 110. If information is retrieved from SCPs 140, the retrieved information is sent to SN 134 at step 330. A call from a calling party for which no information is available may be announced as "unknown number." A call from a private (i.e. blocked) number may be announced as "private number."

At step 332, SCP 118 instructs SSP 116 to complete the call. SSP 116 instructs SN 134 to make the call. SN 134 makes an outgoing call, preferably on line (215) 555-0002 to subscriber station 112. SCP 118 may query Home Location Register (HLR) to determine called party status, if the called party is a wireless number.

At step 334, when the call is answered, SN 134 converts information (data) received from SCP 118 to audible signals and broadcasts an audible announcement to subscriber station 112 (the called party) relaying the information associated with telephone station 110 (the calling party) and asking the subscriber station 112 (the called party) to accept or reject the call. In a preferred embodiment SN 134 may employ computer-generated text-to-speech conversion routines or in an alternate, embodiment, pre-recorded sound files or other suitable files may be played. The announcement further provides directions as to how to accept or reject the call. For example, the announcement may direct an operator of subscribing station 112 to "press any key to accept the call." Similarly, operator of subscribing station 112 may be directed to "press the 'end' or 'power off' button to reject the call" if the telephone is a wireless phone. An audio calling name landline subscriber may be instructed to hang up the telephone to reject the call. Failure to press any key may be defined as a tacit indication of acceptance of the call. In an alternate embodiment, failure to press any key within a desired time may result in rejection of the call.

If at step 336, a response is received at SN 134 from subscriber station 112 (the called party) accepting the call, at step 338, SN 134 connects telephone station 110 (the calling party) and subscriber station 112 (the called party). In a preferred embodiment a call transfer function is employed in which case SN 134 signals to SSP 114 to transfer call 1 (the call from telephone station 110 to subscriber 112 that was routed to incoming line (215) 555-0001 of SN 134) to call2 (outgoing line (215) 555-0002 of SN 134 to subscriber station 112) so that telephone station 110 is connected to subscriber station 112, freeing up SN 134 for further calls. In another embodiment two ports (incoming and outgoing lines) of SN 134 are tied up to maintain the connection between telephone station 110 and subscriber station 112.

If at step 336, a response is received at SN 134 from subscriber station 112 (the called party) rejecting the call, at step 340 the call is routed to the subscriber station 112's voicemail or if subscriber station 112 has no voicemail, telephone station 110 continues to hear a ringing signal until a ring timer expires, at which time the call ends.

In an alternate embodiment, databases distributed over multiple SNs contain data of at least 50 characters per field. In accordance with this embodiment, at step 322 and 324, SN 134 checks to see if its resident database contains information concerning the calling party, and if information concerning the calling party is found, that information is retrieved and announced. If no information concerning the calling party is found on a database at SN 134, SN 134 accesses SCP 118 through communications link 162 to retrieve the information as previously described.

As described above, the present invention provides a system for audio calling party identification of information associated with a calling party. Upon receipt of a call, a subscriber to the service receives an audible announcement of information about the calling party. The subscriber may accept or reject the call based the received information. Thus, the system frees persons from having to consult a CLID or other visual display to identify the calling party.

It is noted that the written description provided herein contains acronyms which refer to various communication services and system components. Although known, use of several of these acronyms is not strictly standardized in the art. For purposes of the written description herein, acronyms will be defined as follows:

10D—10 Digit
AIN—Advanced Intelligent Network
CCIS—Common Channel Interoffice Signaling
CCS—Common Channel Signaling
CDP—Customized Dialing Plan
CO—Central Office
CPR—Call Processing Record
CPN—Calling Party Number
DLN—Dialed Line Number
DRS—Data and Reports System
EO—End Office
ISCP—Integrated Service Control Point
ISUP—ISDN Users Part
LATA—Local Access and Transport Area
MF—Multi-Frequency
NANP—North American Numbering Plan
NPA—Numbering Plan Area
NXX—Central Office Code
PODP—Public Office Dialing Plan
PRI—Primary Rate Interface
PSTN—Public Switched Telephone Network
SCE—Service Creation Environment
SCP—Service Control Point
SMS—Service Management System
SS7—Signaling System 7
SSP—Service Switching Point
STP—Signaling Transfer Point
TAT—Termination Attempt Trigger
TCAP—Transaction Capabilities Applications Part
TG—Trunk Group
TN—Telephone Number It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects. Additionally, certain features and functions attributed to a particular network element may be performed by another network element without departing from the scope and spirit of the invention. As an example, if a function such as a database query is attributed to a network element such as an SSP, such query may be performed alternatively or additionally by an STP or SCP or by any other network element without departing from the spirit and scope of the invention.

What is claimed is:

1. A method for providing audible and visual caller information for calls routed from a first telephone station to a second telephone station via a switching network, comprising:
   placing a first telephone call from the first telephone station directed to the second telephone station via a first service switching point of the switching network;
   placing a second telephone call from a services node to the second telephone station via a second service switching point, the second call transmitting an audible message to the second telephone station;
   replacing a telephone directory number associated with the services node with a telephone directory number associated with the first telephone station;
   determining information associated with the first telephone station from a database stored at a services control point;
   audibly communicating the information associated with the first telephone station to the second telephone station; and
   visually communicating the telephone directory number of the first telephone station that replaced the telephone directory number associated with the services node to the second telephone station.

2. The method of claim 1, further comprising:
   transmitting an audible message to the second telephone station requesting a response identifying whether to accept or reject the call.

3. The method of claim 2, further comprising:
   receiving from the second telephone station a signal identifying whether to accept or reject the call.

4. The method of claim 3, further comprising:
connecting the first telephone station and the second telephone station if the second telephone station accepts the call; and
terminating the call if the second telephone station rejects the call.

5. The method of claim 4, wherein terminating the call comprises:
connecting the first telephone station with the voice mailbox of the second telephone station.

6. The method of claim 4, wherein terminating the call comprises:
continuing to send a ringing signal to the first telephone station until a ring timer expires.

7. The method of claim 1, wherein receiving a telephone call from the first telephone station directed to the second telephone station comprises:
receiving information associated, with the first telephone station and the second telephone station.

8. The method of claim 1, wherein determining information associated with the first telephone station from a database stored at a service control point, comprises:
receiving at least 50 characters of data from said database.

9. The method of claim 1, wherein retrieving information associated with the first telephone station from the service control point comprises:
retrieving a name associated with the first telephone station.

10. A method for providing audible and visual caller information for calls routed from a first telephone station to a second telephone station via a switching network, comprising:
placing a first telephone call from the first telephone station directed to the second telephone station via a first service switching point of the switching network;
placing a second telephone call from a services node to the second telephone station via a second service switching point;
replacing a telephone directory number associated with the services node with a telephone directory number associated with the first telephone station;
determining information associated with the first telephone station from a database stored at a services control point;
audibly communicating the information associated with the first telephone station to the second telephone station; and
visually communicating the telephone directory number of the first telephone station that replaced the telephone directory number associated with the services node to the second telephone station, wherein retrieving information associated with the first telephone station from the service control point comprises:
at the service control point, queIying a second service control point for the information associated with the first telephone station; and
receiving the information associated with the first telephone station from the second service control point.

11. In an advanced intelligent network comprising a service switching point connected to a first telephone station, a plurality of services nodes each having interactive data systems, a service control point containing a database, and a second telephone station, a method of audibly and visually providing information concerning the first telephone, comprising:

at a first service switching point, placing a first call from the first telephone station to the second telephone station;
at the first service switching point, forwarding a request to the service control point to identify one of the plurality of services nodes to place a second call to the second telephone station;
at the service control point, identifying one of the plurality of services nodes to place the second call to the second telephone station and replacing a telephone directory number associated with the identified services node with a telephone directory number associated with the first telephone station;
at the services node identified by the service control point, forwarding a request to the service control point to provide information associated with the first telephone station;
at the service control point, identifying information associated with the first telephone station from a database on said service control point;
at the services node identified by the service control point, receiving the information associated with the first telephone station from the service control point;
at the services node, placing the second call to the second telephone station and audibly announcing the information associated with the first telephone station to the second telephone station; and
visually communicating the telephone directory number associated with the first telephone station that replaced the telephone directory number associated with the identified services node to the second telephone station.

12. The method of claim 11, wherein identifying information associated with the first telephone station comprises:
retrieving at least more than 15 characters of data from said database.

13. The method of claim 11, wherein the request to the service control point to identify one of the plurality of services nodes comprises information identifying the second telephone station.

14. The method of claim 11, wherein identifying one of the plurality of services nodes to handle a call comprises querying a database using information identifying the second telephone station.

15. The method of claim 11, further comprising receiving at the services node identified by the service control point a request from the second telephone station to accept the call from the first telephone station.

16. The method of claim 11, further comprising receiving at the services node identified by the service control point a request from the second telephone station to reject the call from the first telephone station.

17. The method of claim 11, wherein identifying the information associated with the first telephone station comprises:
querying a database at the services control point for the information associated with the first telephone station; and
if no information is found in the database at the service control point, querying at least another service control point for the information associated with the first telephone station; and
at the service control point transmitting the information associated with the first telephone station to the services node.

18. The method of claim 11, wherein audibly announcing the information associated with the first telephone station to the second telephone station comprises:
converting textual information to audible signals.

19. The method of claim 18 wherein converting textual information to audible signals comprises:
converting textual information to audible signals by means of computer-generated sounds.

20. The method of claim 18 wherein converting textual information to audible signals comprises:
playing pre-recorded sound files.

21. A system for audibly and visually announcing information associated with a first telephone station to a second telephone station, comprising:
a first service switching point in communication with the first telephone station, the first service switching point adapted to place a first call from the first telephone station to the second telephone station;
a services node communicating with the first service switching point, the services node adapted to place a second call to the second telephone station and audibly announce information associated with the first telephone station to the second telephone station; and
a service control point communicating with said first service switching point, a second service switching point and said services node, said service control point replacing a telephone directory number associated with said services node with a telephone directory number associated with the first telephone station, said service control point having a database including information associated with the first telephone station wherein said services node receives said information associated with the first telephone station from said service control point, and communicates an audible announcement of said information to said second telephone station and visually communicates said telephone directory number associated with said first telephone station that replaced said telephone directory number associated with said serviced node via said second service switching point.

22. The system of claim 21, wherein the service control point, upon receipt of a request from the first service switching point, queries a database and identifies a services node adapted to connect the first telephone station and the second telephone station.

23. The system of claim 21, wherein a signal is detected at the first service switching point to initiate a request for audio information associated with the first telephone station to be sent to the second telephone station.

24. The system of. claim 21, wherein the identified services node sends a message to the service control point requesting information concerning the first telephone station.

25. The system of claim 21, wherein the service control point queries the database and returns information concerning the first telephone station to the services node.

26. The system of claim 21, wherein said database including information associated with the first telephone station on said service control point comprises at least more than 50 characters of data.

27. The system of claim 21, wherein said service control point queries at least a second service control point for information associated with the first telephone station.

28. The system of claim 27, wherein said service control point sends information associated with the first telephone station to the services node.

29. The system of claim 21, wherein the services node converts the information associated with the first telephone station to an audible message.

30. The system of claim 29, wherein the audible message is computer-generated.

31. The system of claim 30, wherein the computer-generated message includes pre-recorded speech files.

32. The system of claim 21, wherein the services node requests the second telephone station to identify if the second telephone station will accept or reject the call from the first telephone system.

33. The system of claim 21, wherein the second telephone station accepts the call from the first telephone station and the services node connects the first telephone station and the second telephone station.

34. The system of claim 21, wherein the second telephone station rejects the call from the first telephone station and the services node terminates the call from the first telephone station.

35. The system of claim 34, wherein the services node directs the call from the first telephone station to the second telephone station to the voice mailbox of the second telephone station.

36. The system of claim 35, wherein the services node continues to transmit a ringing signal to the first telephone station until a ring timer expires.

37. The system of claim 21, wherein said services node upon receipt of a request from the second telephone station to accept the call from the first telephone station connects the first telephone station and the second telephone station.

* * * * *